Dec. 14, 1954  R. M. McDONALD  2,697,175
VOLTAGE BOOSTER FOR THE GENERATOR OF MOTOR VEHICLES
Filed Sept. 26, 1952
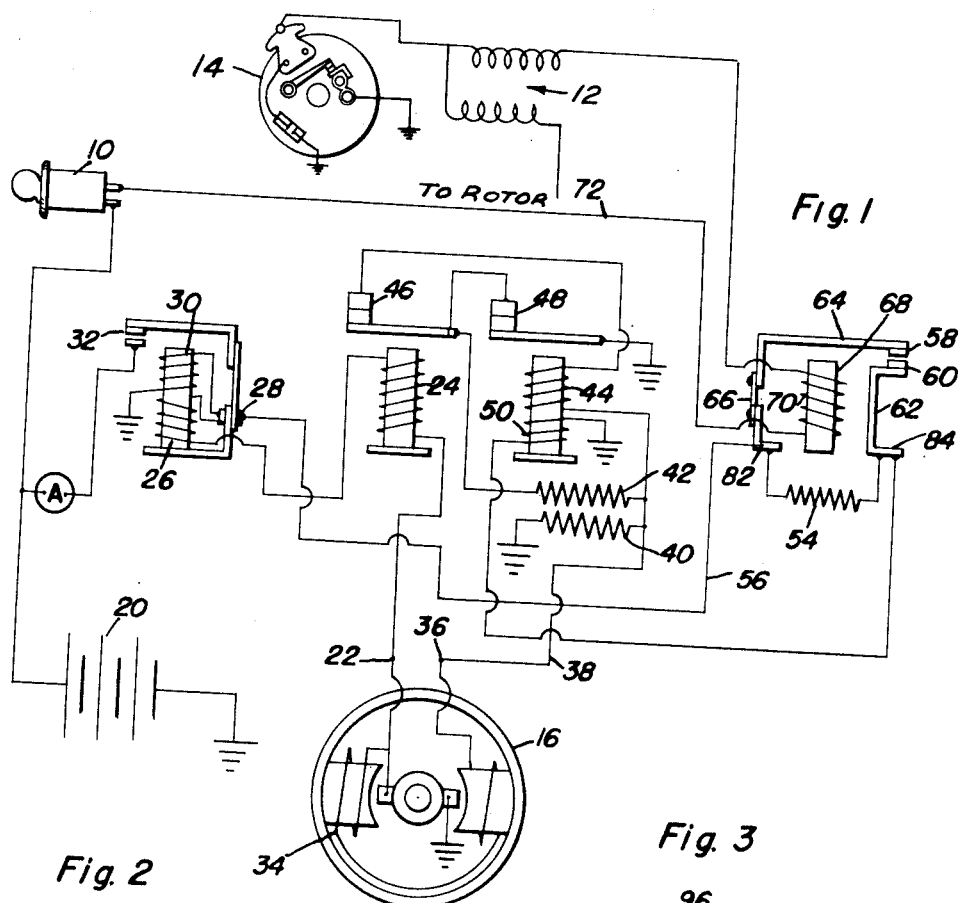
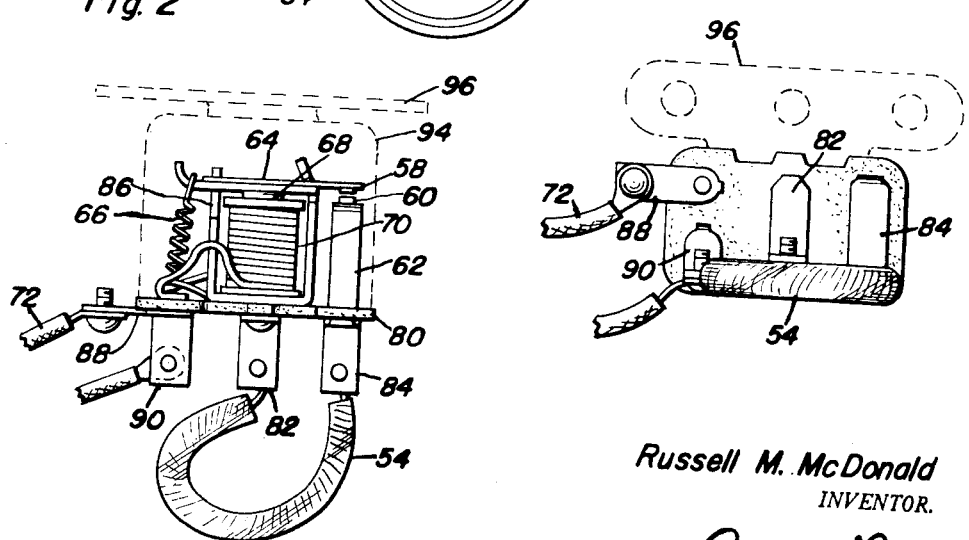
Russell M. McDonald
INVENTOR.
BY *Clarence A. O'Brien*
*Harvey B. Jacobson*
Attorneys

United States Patent Office 2,697,175
Patented Dec. 14, 1954

2,697,175
VOLTAGE BOOSTER FOR THE GENERATOR OF MOTOR VEHICLES

Russell M. McDonald, Conway, Ark.

Application September 26, 1952, Serial No. 311,650

3 Claims. (Cl. 290—50)

This invention relates to a voltage booster for the generator of a motor vehicle and particularly to a device for inserting an impedance in series with the control coil of the usual voltage regulator for the generator of a motor driven vehicle during low operating speeds of the generator driving motor.

In the operation of modern motor driven vehicles it is customary to provide a generator driven by the motor of the vehicle for providing charging current to a storage battery which in turn supplies energy to the various current consuming devices such as the ignition circuit of the automotive device. Heretofore considerable difficulty has been encountered because of the characteristic of the generator regulator which causes it to disconnect the generator from the battery at low operating speeds of the motor driving the vehicle. Consequently, when the motor vehicle is operated for long intervals at low motor speeds the battery may become discharged and not effective in producing operation of the vehicle.

The present invention provides a control system for the usual voltage regulator which utilizes various magnetic switches responsive to voltage or current delivered by the generator for controlling the generator field. Heretofore these voltage regulators have been adjusted for the normal operating speed of the vehicle to provide proper charging current at such operating speeds. However, when the motor vehicle operates at low speeds regulators cut out the generator. According to the present invention an impedance is connected between the voltage source of the generator and the regulator coils and means provided for controlling the application of the impedance. The impedances are then cut in or out of circuit depending upon the speed of the motor driving the vehicle so at low motor speeds the generator will have an additional field current imposed therein to produce sufficient voltage at low speed to produce a charging current for the battery.

It is accordingly an object of the invention to provide a system for boosting the voltage of the charging generator of a motor vehicle electrical system during low motor speeds.

It is a further object of the invention to provide a means responsive to motor speeds for controlling the energization of the regulator circuit for a charging generator.

It is a further object of the invention to provide means responsive to the effective ignition current for controlling the voltage regulator of an automotive generator.

Other objects of the invention will be apparent from the following detailed description taken in conjunction with the accompanying drawing in which:

Figure 1 is a schematic wiring diagram of an electrical charging circuit and the controlling regulator according to the invention;

Figure 2 is a side elevation of a magnetically actuated switch responsive to an effective current for controlling the operative relation of an impedance; and Figure 3 is a bottom plan view of the switch of Figure 2 showing the connections thereto.

In the exemplary embodiment of the invention a motor for driving a motor vehicle (not shown) is provided with an ignition system having the usual key lock switch 10 for connecting the high frequency induction coil 12 in series with rotary breaker 14 having a speed responsive to the motor of the vehicle and a source of potential such as a battery 20.

As is customary in automotive vehicles the battery 20 is charged from a generator 16 having an output terminal 22 which connects to the battery 20 through a series regulator coil 24 and a series cut out coil 26. The terminal 22 is connected through the series connected coils 24 and 26 to a general output terminal 28. As is usual a shunt coil 30 for the cut out operates the cut out contacts 32 to control the connection of the general terminal 28 to the battery 20.

The generator 16 is provided with a field coil 34 which extends to the field terminal 36 from which a conductor 38 extends to the field control system including impedances 40 and 42 connected in parallel relation between the terminal 36 and the ground. Likewise the terminal 36 is connected to the control winding 44 of a regulator control device with the coil 44 being connected in series circuit relation to the contacts 46 of the series regulator coil 24 and the contacts 48 associated with the winding 44. The contacts 46 and 48 serve to connect the winding 44 between the terminal 36 and the ground. The impedance 40 is permanently connected to the ground so as to prevent open circuit of the field winding during operation of the regulator while the parallel impedance 42 is connected through the contacts 48 to ground so that operation of coil 44 together with the shunt coil 50 will control the contacts 48 and control the operativeness of the impedance 42. As is usual the shunt coil 50 is connected between the general output terminal 28 of the generator through the coil 50 to ground. All of the above construction is normal and usually found in various generator voltage regulator systems.

In accordance with the present invention an impedance 54 is connected in series circuit relation with the coil 50 and preferably in the conductor 56 connecting the terminal 28 to the coil 50. A contact terminal 58 is connected to one end of the impedance 54 and a contact terminal 60 is connected to the other end of the impedance 54 with the terminal 60 being mounted on a rigid post 62 and the contact 58 is mounted on a spring biased arm 64. The arm 64 being biased by a spring 66 so that the contacts 58 and 60 are biased to open position. A magnetic device herein shown as an electromagnet 68 having a coil or winding 70 is mounted in operative relation to the arm 64 and when energized is operative to drive contacts 58 into engagement with the contact 60. Coil 70 is connected in series circuit relation with the conductor 72 extending from the key 10 to the ignition coil 12.

For convenience of assembly impedance 54 and the control contacts 58—60 are mounted on an insulating base 80 provided with terminals 82 and 84 for connection of the impedance 54 and which are connected to the arms 64 and 62 of the contacts 58 and 60. The coil 70 and the core 68 are mounted in a U-shaped frame 86 which provides contact between the terminal 82 and the arm 64. The coil 70 is provided with terminals 88 and 90 for connecting the coil 70 in series circuit relation with the conductor 72.

Preferably the insulating base 80 is mounted in a housing 94 having a suitable mounting bracket 96.

In the operation of the device the breaker 14 as is well known will be operated in conformity with the speed of the motor driving the vehicle so that an impulse will be applied to the coil 12 at the proper time to supply ignition impulses through the distributor (not shown) to the various cylinders of the device. As the coil 70 is in series circuit relation with the coil 12 the current through the coil 12 will actuate the coil 70 to cause the arm 64 to move the contacts 58 and 60 into engagement. At low speeds of the motor the breaker 14 will provide relatively long intervals between the times of contact so that a current effective only at relatively long time intervals will be delivered through the coil 70; contacts 58 and 60 will then be opening and closing with the contacts 58 and 60 being open a larger portion of the time. Impedance 54 will then be in series relation with the coil 50 most of the time so that the coil 50 is substantially inoperative to produce any action to open the contacts 48. However, as the speed of the motor increases and consequently the speed of the generator and the breaker 14 increases the rapidity with which impulses are delivered through the coil 70 will increase so that because of the magnetic reluctance of the core 68 and the inertia of the arm 64 the contacts 58 and 60 will remain closed a larger proportion of the time. As soon as the motor has reached a predetermined speed the impulses will come so continually closely spaced that the contacts 58 and 60 will remain closed with the resulting effect of short circuiting the impedance 54 and rendering it inoperative to reduce the potential applied to the coil 50. As soon as this speed is reached the coil 50 will operate in a normal manner so that the coil 50 will add its pull to the coil 44 to open the contacts 48 as is customary in such devices.

It will be apparent that the present system provides an impedance operative to control a portion of the regulator device so that a higher voltage will be maintained in the generator than would normally be maintained during the low speed operation thereof with the result that the battery will be charged at the low speed operation of the motor operating the vehicle.

While for purposes of illustration a presently preferred embodiment of the invention has been shown and described according to the best present understanding thereof, it will be apparent that changes may be made in the construction and arrangement of parts thereof without departing from the true spirit and purpose of the invention.

What is claimed as new is as follows:

1. For use in an automotive battery charging system mounted on an automobile having a primary ignition circuit having a magnetic switching device controlling the field impedance of a charging generator, a device for substantially inhibiting operation of said magnetic switching device at low generator speed comprising an impedance device connected in series circuit relation with said magnetic switching device, a switch connected in shunt with said impedance device, resilient means yieldingly urging said switch to open position, an electromagnetic device operative when energized to urge said switch to closed position, said electromagnetic device being connected in series circuit relation with the primary ignition circuit of the automobile.

2. For use in a battery charging system for an automotive vehicle having a generator for charging a battery, an ignition system, and a voltage regulator controlling current flow from said generator to said battery, a device for boosting the low speed voltage of said generator, said device comprising an impedance device connected to reduce the voltage applied to said voltage regulator, a switch connected across said impedance device, resilient means urging said switch to open position, electromagnetic means operative when engaged to urge said switch into short circuiting relation with said impedance device, said electromagnetic means including a coil, said coil being connected for energization in dependence on the current flow in said ignition circuit.

3. For use in a battery charging system for an automotive vehicle having a generator for charging a battery, an ignition system having a supply circuit, and a voltage regulator controlling current flow from said generator to said battery, a device for boosting the low speed voltage of said generator, said device comprising an impedance device connected to reduce the voltage applied to said voltage regulator, a switch connected across said impedance device, resilient means urging said switch to open position, electromagnetic means operative when engaged to urge said switch into short circuiting relation with said impedance device, said electromagnetic means including a coil, said coil being connected in series circuit relation with the supply circuit of said ignition system.

References Cited in the file of this patent

UNITED STATES PATENTS

| Number | Name | Date |
| --- | --- | --- |
| 1,133,000 | Boury | Mar. 23, 1915 |
| 1,745,130 | Turner | Jan. 28, 1930 |
| 2,005,486 | Wilson | June 18, 1935 |
| 2,151,373 | Claytor | Mar. 21, 1939 |
| 2,266,164 | Claytor | Dec. 16, 1941 |
| 2,289,582 | Loesch | July 14, 1942 |
| 2,348,263 | Rady | May 9, 1944 |
| 2,467,968 | Critchfield et al. | Apr. 9, 1949 |
| 2,494,749 | Fagen et al. | Jan. 17, 1950 |
| 2,556,371 | Hussey | June 12, 1951 |